Patented Dec. 17, 1940

2,225,576

UNITED STATES PATENT OFFICE 2,225,576

YEAST PREPARATION

Charles Weizmann, London, England

No Drawing. Application May 17, 1939, Serial No. 274,260. In Great Britain May 16, 1938

1 Claim. (Cl. 99—97)

This invention relates to the manufacture of a new variety of food preparations or medicinal substances utilizing yeast as a basic constituent, and is particularly concerned with the early stages of the treatment of yeast for such purposes, viz. the liquefaction by plasmolysis of the yeast to furnish a plasmolysate which can be further used and/or treated if necessary for example with sugar containing material such as fruit concentrates.

Among the agents hitherto proposed and employed to bring about plasmolysis of yeast and to do so in a rapid way, few if any can be used without attendant disadvantages when edible products of a fine quality and seemingly natural flavor are to be obtained. Thus ethyl acetate or other such cell poisons, although of rapid action, detrimentally affect flavor; notwithstanding their being volatile and, for the most part, easily removable, the taste of the ultimate product suffers to a greater or less extent. Indeed among the known plasmolyzers sugar alone is practically unobjectionable in such respects, but the introduction of the relatively high percentages of sugar necessary in practice when it is used alone for plasmolysis without fermentation results in a plasmolysate which, in the absence of subsequent treatment, is often much too sweet for the purposes for which the ultimate product is required. Again a control of sweetness of the plasmolysate when sugar alone is used as plasmolyzer is not practicable as the quantity of sugar used is not only essentially a function of the plasmolysis, determining the extent of the latter, but also must be very high in order to avoid fermentation in the absence of antiseptics.

According to the present invention, such disadvantages as the foregoing are overcome, and a plasmolysate of yeast is secured both in a rapid manner and having from the outset a pleasant flavor with freedom from artificial substances.

The invention consists in the method of manufacturing food preparations wherein yeast is subjected to rapid plasmolysis by the action of the juice, as expressed or after concentration, of fruits of substantial sugar- and organic acid-content.

The invention also consists in a method according to the preceding paragraph, comprising forming a plasmolysate in the manner stated, and gradually heating it to a temperature of the order of 50–60° C. and maintaining such temperature for a time.

The invention further consists in a method according to the two preceding paragraphs, comprising the incorporation of sugar to augment sweetness apart from plasmolytic action of natural fruit juice, its concentrates, or corresponding or equivalent acid- and sugar-compound or mixture.

The invention further consists in a method according to any of the three preceding paragraphs comprising the addition of pectinaceous material to a heat-treated plasmolysate or plasmolysate-sugar and/or -fruit juice mixture.

The invention further consists in the method of manufacturing alimentary substances substantially as hereinafter described and further set forth in the appended claim.

The invention also consists in the new or improved alimentary products hereinafter set forth, or claimed.

I may obtain plasmolysis by the addition to yeast, e. g. fresh baker's yeast or pressed debittered brewer's yeast, of the juice of fruits, in particular fruits of an acid character and agreeable flavor and including the sugars and acids natural to such fruits. The juices as expressed from the fruits may be used directly, or better in concentrated condition to secure an optimal concentration of magma and avoid undue dilutions.

As examples of fruits whose juices appear of greatest utility there may be named red-currants, black-currants, pineapple, grapes, the so-called "citrous" fruits such as lemons, oranges and grapefruit, these fruits having a substantial content of natural organic acids such as malic acid and citric acid together with a high or considerable percentage of natural sugar.

Plasmolysis is completed and liquefaction obtained in a very short time, as appears from the following particulars which include suitable proportions in which the yeast and the plasmolyzer may be associated:

(a) With 25 grams fresh baker's yeast are mixed 2.5 grams concentrated red-currant juice (containing 48% sugar and 17.5% acid calculated as citric acid); plasmolysis is completed within one minute.

(b) With 25 grams fresh baker's yeast are mixed 2.5 grams pineapple juice (containing 52% sugar and 5.2% acid calculated as citric); plasmolysis is completed in three minutes.

The satisfactory plasmolysis is thought to be due at least in part to the mutual enhancement of the separate actions to be expected of the acid or the sugar alone in even the small proportions appearing above, for it has been found that a mixture of sugar and acid—as contained in natural fruit juices—is a more powerful plasmolyzer than either sugar or acid alone in the same quantities.

As illustration of this finding, (a) 1.0 gm. sugar and 1 cc. water were mixed with 25 gm. yeast: plasmolysis took place after 2 minutes, 30 seconds; (b) 1.0 gm. malic acid and 1 cc. water were mixed with 25 gm. yeast: plasmolysis did not take place until after 7 minutes; (c) 1.0 gm. sugar and 1.0 gm. malic acid and 1 cc. water were mixed with 25 gm. yeast: plasmolysis took place after 50 seconds.

A compounding of an edible organic acid and sugar, e. g. of malic or citric acid and sucrose so as to simulate the natural compound of the fruit juice, gives comparable results to the latter and is to be regarded as within the ambit of this invention. As it is desired to impart into the plasmolysate the flavor which is characteristic of the fruits and difficult to reproduce as by subsequent addition of flavoring materials, natural fruit concentrates are preferred as plasmolyzers. However, if the natural fruit flavor is very sensitive or fugitive, e. g. the flavor of grapefruit juice, the plasmolysis may be effected by a mixture of sugar and fruit acid, and a fruit concentrate incorporated at a later stage.

The use of natural juices per se or equivalent acid-sugar compounds or mixtures, for plasmolysis, has the important advantage of introducing no artificial substances into the foodstuff, and it avoids on the one hand oversweetening of the final product, as results from the use of sugar only, and on the other hand the making of the product less palatable or quite unpalatable as results from the introduction of acid only.

Whilst the proportions of the constituents may vary in accordance with both the results required and the choice of materials employed, a moderately sweet product, for instance, can be made by adding to about 5 kg. of fresh baker's yeast some 2.25 kg. of red-currant concentrate. Plasmolysis takes place at once, and the liquid mass is mechanically stirred and gradually heated to about 50° C. After the step of plasmolysis, which is quick and powerful, temperature treatment is advisable, especially for completion of (a) proteolytic action on the yeast proteins to render these proteins soluble, and (b) (which may be more important) to effect a good inversion of the sugar (saccharose) by means of yeast enzymes set free, more especially when further sugar has been added after the plasmolysis or even before it. Such heat treatment may last from one to two hours at about 50° C. After this stage a further addition may, if desired, be made of, for example, 5 kg. sugar, to impart a desired sweetness and consistency to the mixture.

The temperature of the batch may furthermore be gradually increased to about 95° C. and may be maintained at this temperature for some time according to the product desired, as long as 72 hours in some cases.

In carrying out the invention on a larger scale, one may proceed in accordance with the following illustrative examples:

EXAMPLE I

To 400 parts of fresh baker's yeast 200 parts of red-currant concentrate are added in the cold. When the mass has become quite liquid, i. e. plasmolysis is finished, 500 parts of cane sugar are added and the mass immediately heated with vigorous mechanical mixing to 50–60°, preferably 55°. The mass with continued agitation is kept at this temperature for one hour to complete the inversion of saccharose, and then further gradually heated to 95° C.

Finally the temperature is again raised to 105° C., which temperature is maintained for 15 minutes. The mixture is then cooled. At the beginning of the cooling period a quantity of pectin as concentrated aqueous solution may be added so as to give the final product the desired consistency, e. g. a jelly-form.

EXAMPLE II

To 700 parts of fresh baker's yeast, 300 parts of pineapple concentrate are added in the cold. After liquefaction of the yeast, another 200 parts of cane sugar are added and the mass immediately heated to 55° C.

Further treatment corresponds to that given in Example I.

EXAMPLE III

*Illustrating the use of juices of very sensitive flavors, e. g. grapefruit juice; plasmolysis being effected with sugar plus acid and the juice or concentrate being added after heat treatment*

To 1000 parts of fresh baker's yeast a mixture of 100 parts of citric acid and 500 parts of cane-sugar are added. The plasmolysate is then heated to 55° C., kept at this temperature for one hour and, after the addition of another 700 parts of cane sugar, gradually heated to 95° C. After the final treatment for 15 minutes at 105° C., the mass is cooled to 50° C., mixed with 500 parts of grapefruit concentrate and an amount of pectin (as concentrated aqueous solution) such as to give the final cold product the desired consistency.

The invention enables a new variety of food preparations to be obtained which are sweet, but not oversweet, possess a pleasant taste and natural, not artificial, flavor, and are rich in vitamins of yeast (i. e. of the B-group) and of fruits (i. e. C) which are mostly preserved. Proteins of yeast appear in degraded form and easily digestible as also is the sugar whether originally so (as in the case of invert sugar or glucose) or rendered so in the heating treatment.

I claim:

The process which consists in incorporating in the cold 400 parts of fresh bakers' yeast with about 200 parts of red-currant concentrate and after the mass has thereby become liquid mixing in about 500 parts of cane sugar, then heating with vigorous mechanical mixing to a temperature of about between 50 and 60° C., maintaining the mass at this temperature for about one hour, gradually raising the temperature to about 95° C., allowing the mixture to remain at this temperature for a time, raising the temperature to about 105° C., maintaining at this temperature for about fifteen minutes and then cooling.

CHARLES WEIZMANN